G. D. PARKER.
HAND TRUCK.
APPLICATION FILED JUNE 1, 1908.
Reissued Apr. 27, 1909. 12,948.
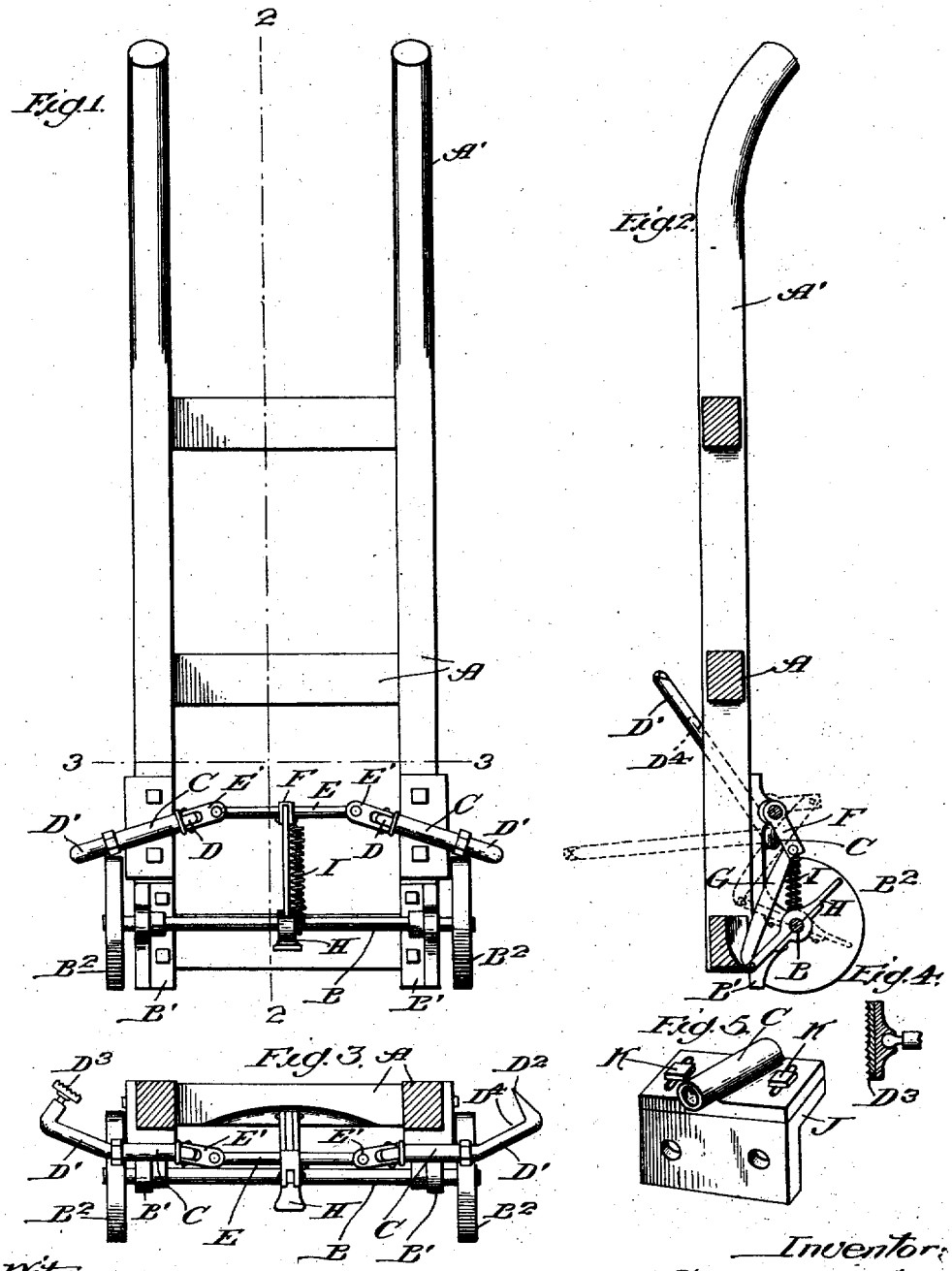
Witnesses:
Inventor:
George D. Parker
By Raymond Ives Blakeslee
his Attorney.
THE NORRIS PETERS CO., WASHINGTON, D. C.

UNITED STATES PATENT OFFICE.

GEORGE D. PARKER, OF RIVERSIDE, CALIFORNIA.

HAND-TRUCK.

No. 12,948. Specification of Reissued Letters Patent. Reissued April 27, 1909.

Original No. 862,194, dated August 6, 1907, Serial No. 348,876. Application for reissue filed June 1, 1908. Serial No. 436,167.

*To all whom it may concern:*

Be it known that I, GEORGE D. PARKER, a citizen of the United States, residing at Riverside, in the county of Riverside and State of California, have invented new and useful Improvements in Hand-Trucks, of which the following is a specification.

This invention relates to trucks intended to be used in upright position and provided with devices to grip a box or the like and hold it against the front side of the truck during transportation, with the weight of the load itself meantime maintaining the grip with a force proportional to such weight.

Among the objects of the invention are: to provide devices that can be readily attached to any ordinary truck already in use to convert it into a truck of the kind just mentioned; to provide a truck that will grasp boxes of widely different sizes without any adjustment whatever; to provide a truck with devices that when slightly engaged with the box will automatically increase their gripping force to any necessary extent, hold the box securely, and automatically release the box and return to initial position when the operator permits such action; and to simplify and lessen the cost of such trucks.

In the accompanying drawings, Figure 1 is a rear view of the truck, the parts being in position for holding a box. Fig. 2 is a section on the line 2—2, Fig. 1, but with the parts ready for gripping a box. Fig. 3 is a section on the line 3—3, Fig. 1. Fig. 4 is a detail view of a certain gripping block. Fig. 5 is a perspective view of a modified bearing that may be used when a very wide range of adjustment is desired.

In these views, A represents an ordinary truck frame provided with handles A′ and an axle B mounted in suitable bearings B′ and provided with wheels $B^2$. Upon the rear side of the frame and a little above the axle are bolted bearings C inclined downward at their outer ends. In each bearing works a rock-shaft D from which a rigid arm D′ extends obliquely forward beyond the plane of the front side of the truck and bears at its inwardly-turned end a box-engaging spur $D^2$ or block $D^3$, as shown in this instance, one arm bearing a spur and the other a frictionally engaging block having a roughened surface which may be of rubber or otherwise. The inner higher end of each shaft D is connected to the adjacent end of a horizontal bar E by any suitable universal coupling E′. Near the middle of this bar and rigidly connected thereto, is a rearwardly projecting arm F whose free end is pivotally connected, by a link G, to the rear end of a foot lever H removably mounted upon the axle B and normally having its rear end held in raised position by a spring I loosely encircling the axle at one end and at its opposite end attached to the free end of the arm F. When the truck is not in use, the spring holds the movable clamping parts in the positions indicated in Fig. 2, the box-engaging ends of the clamp arms D′ being at their maximum distance apart and also at the maximum height above the lower end of the truck.

If the foot lever be pressed down, the link pushes the arm F upward rotating bar E forwardly, and this motion being transmitted to the oblique shafts D by the connections E′ the ends of the arms D′ are swung downwardly forward, if the normal elevation of the same be greater than that of the bearings C by means of which the arms D′ are fulcrumed. Otherwise, the ends of the arms D′ are swung downwardly inwardly. This downward and inward, or oblique swing of the ends of the arms carrying the spurs $D^2$ or blocks $D^3$ is the essential operative movement of the same. The inward movement is toward the medial plane of the truck frame and toward the face of the truck frame. The ends of the arms also approach each other. Owing to the obliquity of the shafts these ends gradually approach during their entire swinging movement, the limit of approach being reached when they reach their lowest point, which is a little above the lower end of the truck. If now the front of the truck be brought up to a box of a width between the maximum and minimum separation of the devices $D^2$, $D^3$ and if the foot lever be then pressed down, these devices move obliquely inward until they meet the sides of the box, against which they are momentarily pressed by the action of the foot, and during that moment the truck is swung rearward upon its axle. This movement tends to raise the ends of the clamping arms, since they cannot swing downward without the approach which the box prevents, and thus the box is lifted bodily. Its weight obviously tends to produce rotation of the shafts D and the greater the weight the stronger the grip on the clamping arms. Usually the slight yielding of the gripped and gripping parts causes the box to descend slightly, with reference to the truck frame. The load being raised so that its forward pull upon the hands of the operator is not excessive, it is wheeled to any desired point and deposited by merely allowing its weight to swing the truck forward until its entire weight rests upon the floor or earth, when the free ends of the arms being no longer pulled down, the spring swings them away from the box and back to initial position with no attention whatever from the operator. Thus the only action the operator need take at any time for the special purpose of seizing or releasing a load is to press the foot lever once, in the seizing operation, be the box large or small.

The mutual approach of the clamping ends of the arms is gradual and at approximately the same rate at all points in their paths, and hence the gripping effect is nearly the same and the tendency of the weight of the box to maintain this effect is nearly the same whatever the size of the box, that is whether it be gripped early or late in the swinging of the arms. The clamping ends of the arms, because of their oblique movement, move inwardly toward the face of the truck, bringing the load, in positive embrace, against the frame of the truck.

It is plain that the limits of movement of the arms will vary with the inclination of the axis of rotation, and if desired this angle may be made adjustable. One construction permitting such adjustment is shown in Fig. 5, the bearing being secured upon a bed J by bolts K passing through slots, whereby the bolts being loosened the bearing may be properly rotated in its own plane upon the bed.

In case certain boxes to be handled are not thick enough to be gripped by the in-turned ends of the arms, the arms themselves grip the boxes; and, to insure a secure hold, projections having a roughened or rubber face may be provided upon the arms, as shown in dotted lines at $D^4$.

As shown, the shafts D lie in one plane rearward of the truck frame and are parallel to the plane of the truck frame; but variation in this respect is permissible. Nor is it indispensable that each shaft be in a plane parallel to the plane of the frame, but only that it be not perpendicular to the medial plane of the truck,—as the axle is in the form illustrated.

I believe it to be novel to provide a swinging load-clamping arm, or swinging load-clamping arms, combined with means causing the same to swing downwardly and inwardly, or forwardly as well as downwardly and inwardly, or obliquely; such means in the embodiment of the invention herein disclosed and illustrated in the drawing comprising the inclined bearings C for the shafts D with which the arms D′ are connected. The means causing this described movement of the load-clamping arms may be widely varied within the scope of the invention.

It is to be observed that the entire clamping apparatus may be quickly attached to or detached from ordinary trucks without modifying the construction of the latter; and it is also obvious that the details of construction may be changed without passing outside the proper limits of my invention.

What I claim is:

1. A truck of the character described provided with a load-clamping arm, said arm being mounted to swing toward the medial plane of the truck frame and toward the face of the truck frame; means for forcibly swinging the load-clamping arm; and means for preventing movement of the load away from said load-clamping arm.

2. A truck of the character described provided with load-clamping arms, said arms being mounted to swing toward the medial plane of the truck frame and toward the face of the truck frame; and means for forcibly swinging the load-clamping arms simultaneously.

3. A truck of the character described provided with load-clamping arms, said load-clamping arms being mounted to swing at their outer ends toward each other and toward the face of the truck; and means for forcibly swinging the load-clamping arms simultaneously.

4. A truck of the character described provided with a load-clamping arm, means causing the load-clamping arm to swing downwardly and inwardly and obliquely toward the face of the truck, and means for preventing movement of the load away from said load-clamping arm.

5. The combination of a truck adapted for use with its frame upright, of a load-clamping arm mounted at one side of the truck to swing upon a fixed axis downwardly forward with respect to the truck when in vertical position and toward its medial plane, and means at the opposite side of the truck for preventing movement of the load away from said arm.

6. The combination of a suitable truck frame of load-clamping arms mounted on the truck to swing in front of the plane of the upright truck upon fixed axes inclined to each other, whereby the free ends of the arms approach in swinging.

7. The combination with a truck frame, of load-clamping arms mounted upon opposite sides of the frame to swing from its plane upon fixed axes oblique to each other, and means for forcibly swinging the arms simultaneously.

8. The combination with an upright truck frame of arms mounted upon the truck to swing upon fixed axes downwardly forward with respect to the truck when in vertical position and toward each other, means for compelling them to so swing simultaneously, and automatic means for restoring them to normal position when the compelling force ceases to act substantially as set forth.

9. The combination with an upright truck, of two downwardly and outwardly inclined shafts mounted upon the frame near its lower end and on opposite sides, respectively, rigid clamping arms extending laterally from the outer ends of said shafts, respectively, a foot lever connected to both shafts to rotate them, and a spring resisting such rotation.

10. The combination with an upright truck, of downwardly and outwardly inclined shafts mounted upon its rear side, rigid arms projecting laterally from said shafts, respectively, to grasp a load in front of the truck, a bar having its ends connected respectively, to the inner ends of said shafts by universal-joint devices, an arm projecting laterally from said bar, a foot lever detachably mounted upon said truck below said bar, a link connecting said lever to said bar, and a spring yieldingly resisting the movement of the foot lever and parts operated thereby.

11. As an attachment for hand trucks, the combination with two bearings adapted to be attached to the side bars, respectively, of a truck, of load gripping arms mounted in said bearings, respectively, to swing upon axes oblique to the medial plane of a truck when the bearings are properly mounted thereon, and foot-operable devices connected with the arms for swinging them.

In testimony whereof, I have signed my name to this specification in the presence of two subscribing witnesses.

GEORGE D. PARKER.

Witnesses:

THEO. D. HEWITT,

E. B. HEWITT.